United States Patent [19]
Wuertz et al.

[11] Patent Number: 5,422,434
[45] Date of Patent: Jun. 6, 1995

[54] UNITARILY CONSTRUCTED CARPET FLANGE WITH SELF-CLOSING FLAP COVERS FOR A FLOOR BOX WIRING FITTING

[75] Inventors: Emil S. Wuertz, Madison; William C. Boteler, Bridgeport; Francis M. DeLash, Milford, all of Conn.

[73] Assignee: Hubbell Incorporated, Orange, Conn.

[21] Appl. No.: 47,919

[22] Filed: Apr. 19, 1993

[51] Int. Cl.6 ............................................. H02G 3/22
[52] U.S. Cl. ........................................ 174/48; 174/67
[58] Field of Search ................. 174/48, 67; 220/242; 439/135, 142

[56] References Cited

U.S. PATENT DOCUMENTS

| | | | |
|---|---|---|---|
| 4,443,654 | 4/1984 | Flachbarth et al. | 174/48 |
| 4,770,643 | 9/1988 | Castellani et al. | 439/135 |
| 4,827,080 | 5/1989 | Castellani et al. | 174/48 |
| 4,864,078 | 9/1989 | Bowman | 174/48 |
| 5,032,690 | 7/1991 | Bloom | 174/48 |
| 5,064,969 | 11/1991 | Bloom | 174/67 |
| 5,107,072 | 4/1992 | Morgan | 174/48 |

*Primary Examiner*—Leo P. Picard
*Assistant Examiner*—David A. Tone
*Attorney, Agent, or Firm*—Jerry M. Presson; Leopold Presser

[57] ABSTRACT

A floor box wiring fitting incorporating a novel carpet flange possessing a self-closing flap cover assembly, whereby the fitting is adapted to be cast into a concrete floor of a building for the conductance of electrical power or telecommunication signals between the work spaces of buildings. The self-closing action of the flap covers which are hingedly connected to the flap cover plate structure, the latter of which consists of a carpet flange, is essentially implemented through an angular operative contacting relationship between the wall surfaces of the openings receiving the hinging portion of the flap covers and the contiguous or adjacent wall surface of the flap cover which, in effect, will inhibit the flap covers from being opened or swing upwardly from a closed horizontal position to an acute opening angle greater than about 85°. This acute maximum opening angle measured from the horizontal upper surface of the carpet flange will cause the flap covers to be downwardly closed, in the absence of any plug connectors or receptacles being inserted through the carpet flange, under the action of their own weight or gravity. Also included is novel structure for staking hinge connections of the flap covers in place, and structure for latchingly engaging the flap covers in their closed positions.

12 Claims, 4 Drawing Sheets

UNITARILY CONSTRUCTED CARPET FLANGE WITH SELF-CLOSING FLAP COVERS FOR A FLOOR BOX WIRING FITTING

BACKGROUND OF THE INVENTION

1. Field of the Invention

The present invention generally relates to an in-floor single-service wiring fitting and, more particularly, pertains to a floor box wiring fitting incorporating a novel carpet flange possessing a self-closing flap cover assembly, whereby the fitting is adapted to be positioned in a floor aperture of a concrete building floor for the conductance of electrical power or telecommunication signals between the work spaces of multi-storied buildings.

In essence, during the erection of building structures of various types; for instance, such as modern multi-storied office buildings possessing concrete floors, it is frequently necessary, and also commonly accepted building practice, to normally provide floor boxes cast into the floors of ground level and conduits for insulated conductors, wires, cables and the like, which are employed for the transmission of electrical power and telecommunication signals through suitable floor boxes which are cast into concrete building floors, and whereby electrical power or other kinds of signals, such as telecommunication signals, may be readily transmitted from a suitable source; for instance, from a junction box located at or proximate one face of the concrete floor, through the floor box in the concrete building floor to a suitable outlet or service head which is located at the opposite face of the floor.

Depending upon the type of installation required for the service head or outlet which is located at the face of the floor opposite from that towards the junction box, at frequent instances of installation, the service head is adapted to be mounted flush on the surface of the floor or on a carpet which covers the floor; in which case, the service head or outlet is ordinarily mounted in a cover plate encompassed by a metallic or brass carpet flange or other suitable carpet flange structure. Hereby, such carpet flanges, while protecting the cover plate structure for the outlet or service head, also include closeable flap covers so as to provide for a smooth and aesthetically pleasing decorative surface appearance which, to an appreciable degree, will prevent an occupant or persons walking over the carpeted floor space from tripping on the service head and possibly sustaining some injury. Moreover, the service head should also be adapted to enable the passage therethrough of various cables, such as for telecommunications and telephone signals, while providing for ready access to plug connectors enabling the connection of electrical wires leading to suitable lamps, computers and/or word processors.

2. Discussion of the Prior Art

Although various types of service heads of the type under consideration herein are currently in widespread use in the building industry, particularly such as incorporating cover assemblies fastened in either brass or plastic carpet or floor flanges which are flush mounted on a carpet or floor, and which assemblies provide for cover plate structure communicating with plug connectors and/or openings for telecommunication cables leading from a junction box to the floor aperture through the service head, none of these prior art structures provide for a unitarily constructed brass carpet flange and flap cover structure essentially having metallic or brass flap covers which are self-closing in nature in the absence of any plug connectors of the service head being mounted on the carpet flange. These self-closing flap covers inhibit the ingress of dirt, dust and contaminants to the plug connectors and the fitting components contained within the floor aperture when not in use, while providing a smooth surface of an aesthetically highly pleasing appearance, and which will concurrently ameliorate the danger or hazard of an occupant of the workspace tripping over such service head.

Thus, among various types of wiring fittings which are equipped with service heads or outlets adapted to be positioned fastened in place on or proximate the face of a floor or on a carpeted floor surface, these generally incorporate a closure plate or cover plate assembly fastened to a carpet or floor flange, Castellani, et al. U.S. Pat. No. 4,770,643 disclose an in-floor fitting, wherein a carpet flange has a central recessed portion containing an opening, in which recessed portions there is positioned a closure plate. Although this provides for a relatively smooth surface in combination with the carpet flange when mounted on a carpet or building floor surface, there is no disclosure of a carpet flange with flap covers for a floor box wiring fitting. The openings of the socket connectors adapted to receive the plug prongs are always exposed to the surroundings, thereby allowing for the ingress of dust and other contaminants which; in essence, can conceivably ultimately prevent the presence of an appropriate electrical contact between socket connectors and plug prongs and/or constitute a hazard of fire due to carpet fibers. being forced into the electrical connector portions.

Similarly, Castellani, et al. U.S. Pat. No. 4,827,080 disclose a carpet flange as a component of a service head adapted to be fastened to a top plate of a poke-through fitting, and in which a molded plastic cover insert is adapted to be positioned in a recessed central cutout of the carpet flange and fastened thereto by means of suitable screw members and the like. However, as in the case of the previously-discussed Castellani, et al. U.S. Pat. No. 4,770,643, the electrical socket connectors for receiving the plug prongs are continually exposed and potentially subject to the ingress of and contamination by dust and/or other dirt particles, thereby rendering this service head subject to the same drawbacks and disadvantages.

Morgan U.S. Pat. No. 5,107,072 discloses a flush-mounted service head for a poke-through fitting, including a carpet flange in which there is fastened a cover plate for the poke-through in-floor fitting. However, as in the previously-discussed patents, the prong-receiving openings of the plug connectors are constantly exposed to the surroundings while; moreover, the portion of the cover plate containing the plugs is somewhat recessed relative to the surfaces of the plug connectors, thereby producing an uneven exposed and partially recessed upper surface which can conceivably cause an occupant or person utilizing the floor space and walking over the service head to trip and sustain injuries, while also providing a dirt or dust-collecting environment.

Still another construction relative to a service head incorporating flap covers of generally the type considered herein is disclosed in Bloom U.S. Pat. No. 5,032,690, wherein a carpet flange of an in-floor fitting or poke-through connector assembly is preferably constituted of a metallic material, such as brass, and which includes a central aperture and a circular disc-shaped cover plate having break-out plugs extending radially inwardly from the plate rim for the through-passage of insulated cables, and with pivotable brass flap covers hingedly connected with the carpet flange being positionable over plug connectors. However, in this particular instance, the flap covers are normally biased into closed positions over openings formed in the carpet flange through the intermediary of spring members which are expensive and difficult to install, while being subject to breakage or malfunction during repeated opening and closing of the flap covers. Additionally, inasmuch as carpeting and other contaminating material can conceivably enter the spaces about the hinge of the opened flap covers, it is also possible that such materials could inhibit the appropriate functioning of the spring elements tending to normally bias the flap covers into a closed relationship when not in use.

SUMMARY OF THE INVENTION

Accordingly, in order to eliminate or considerably ameliorate the limitations and drawbacks encountered in prior art constructions of service heads for in-floor or poke-through wiring fittings of the type described herein, in which a unitarily constructed flap cover structure for the fitting is in the form of a brass carpet flange for particularly a floor box wiring fitting to enable it to be positioned fastened in place in an essentially flush or low-profiled relationship on a carpeted floor surface. Hereby, the carpet flange incorporates a flap cover plate consisting of a metallic material, preferably such as brass or the like, including apertures formed in the cover plate, such as for the receipt of duplex receptacles, and with self-closing metallic flap covers being hingedly connected to the cover plate so as to, during non-use, essentially be able to automatically close off the apertures formed in the flap cover plate under the effect of their own weights or gravity.

Pursuant to another aspect of the invention, the self-closing action of the flap covers which are hingedly connected to the flap cover plate structure, the latter of which consists of a carpet flange, is essentially implemented through an angular operative contacting relationship between the wall surfaces of the openings receiving the hinging portion of the flap covers and the contiguous or adjacent wall surface of the flap cover which, in effect, will inhibit the flap covers from being opened or swing upwardly from a closed horizontal position to an acute opening angle greater than about 85°. This acute maximum opening angle measured from the horizontal upper surface of the carpet flange will cause the flap covers to be downwardly closed, in the absence of any plug connectors or receptacles being inserted through the carpet flange, under the action of their own weight or gravity.

Hereby, when not in use, in essence, when the flap covers are in their closed positions, latching means, in the form of the recessed head of a turnable bolt member mounted in the carpet flange adjacent the edge of respectively each of the flap covers, may be activated so as to latchingly engage. the therewith associated flap cover and prevent the latter from being opened. Thereafter, when it is desired to open the respective flap cover, it is merely necessary to turn the associated latching element or bolt, causing the head thereof to release the latching of the flap cover for enabling opening movement thereof.

Pursuant to a further feature of the invention, the hinging connection between each of the flap covers and flap cover plate is effected through the insertion of a pin member through the hinging portion, and with the ends of the pin members opposite each of the hinging portions of the respective flap covers being staked to prevent axial displacement of the hinging pins. Although separate hinging pin members may be employed for attaching the hinging portion of each flap cover to the flap cover plate of the carpet flange, it is also possible to utilize a single through-extending pin member for hingedly connecting the collective flap covers to the flap cover plate, and staking such pin member in place at suitable locations along the length thereof. This will then provide, in an extremely simple mode, a secure hinging connection between the flap covers and the flap cover plate structure so as to provide a unitary carpet flange with self-closable flap covers.

Accordingly, it is an object of the present invention to provide a unitarily constructed metallic or brass carpet flange with hingedly connected self-closing flap covers of the type described herein.

Yet another object of the present invention is to provide a floor box fitting incorporating a unitarily constructed brass carpet flange with self-closing flap covers.

Still another object of the present invention is to provide a carpet flange for a floor box fitting incorporating self-closing flap covers which are constructively inhibited from being opened to an angle greater than an acute angular relationship from the horizontal, and which are self-closing under the effect of gravity or their inherent weight in the absence of any biasing or spring members for the closure thereof.

A further object of the present invention resides in the provision of a carpet flange having integral flap covers provided therein, in which the hinging connections between the flap covers and the plate structure of the carpet flange is effected in a simple manner, whereby the single through-extending hinge pin is or a plurality of hinge pins are staked in position so as to prevent axial displacement thereof and disengagement between the plate structure and flap covers.

BRIEF DESCRIPTION OF THE DRAWINGS

Further features and modifications, as well as other advantages of the invention may now be more readily ascertained from the following detailed description of an exemplary embodiment of a unitary or single-piece carpet flange with integral self-closing flap cover structure for a floor box fitting, taken in conjunction with the accompanying drawings; in which.

DETAILED DESCRIPTION

Figure 1:
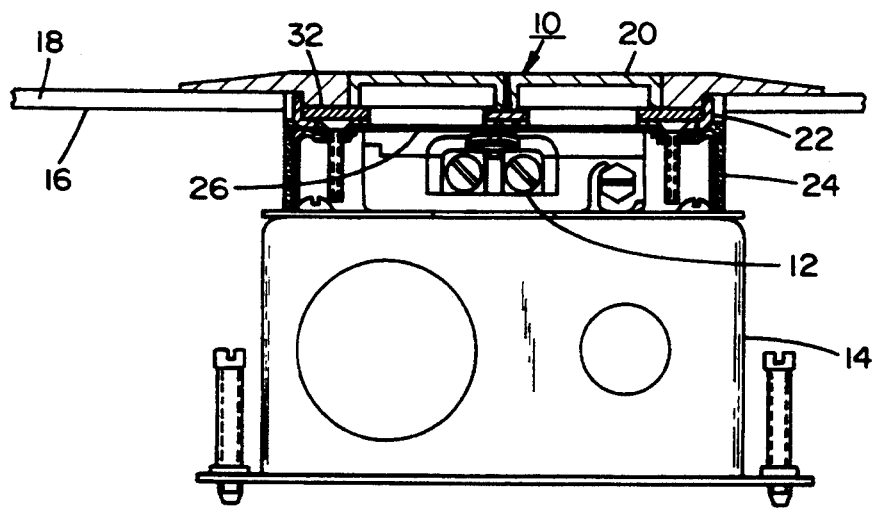
FIG. 1 illustrates a vertical sectional view through a floor box wiring fitting incorporating a unitary carpet flange and self-closing flap cover structure pursuant to the invention.

Referring now to the drawings, and in more specific detail to FIG. 1, there is described and disclosed an exemplary floor box wiring device or fitting 10 which is cast into a concrete floor of a building structure, as is well known in the building technology. In this instance, the floor aperture may be of standard circular configuration and is adapted to receive electrical wiring connections 12 for the through-passage of insulated wiring and signal lines for electrical power or telecommunications equipment extending from one floor space to another floor space of a building structure. The wiring connections may be attached to a junction box 14 through conduits extending downwardly therefrom at connecting location 15, and if desired, the wiring fitting 10 may comprise suitable tubular channels.

The upper end of the aperture formed in the concrete building floor communicates with a horizontal floor surface 16 adapted to be covered by carpeting 18 having a suitable opening formed therein extending about the aperture in the concrete floor.

Connected to the upper end of the wiring fitting and adapted to be supported on the surface of the floor covering or carpeting 18 is a unitarily constructed or single piece carpet flange 20 which is constructed in conformance with the present invention; and preferably from brass or the like.

Figure 2:
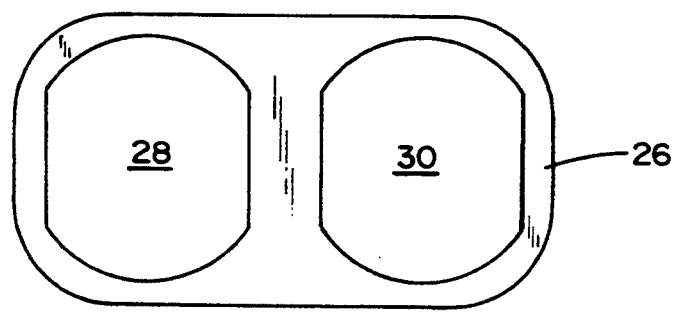
FIG. 2 illustrates a plan view of a plate member utilized in conjunction with the wiring fitting of FIG. 1.
Figure 3:
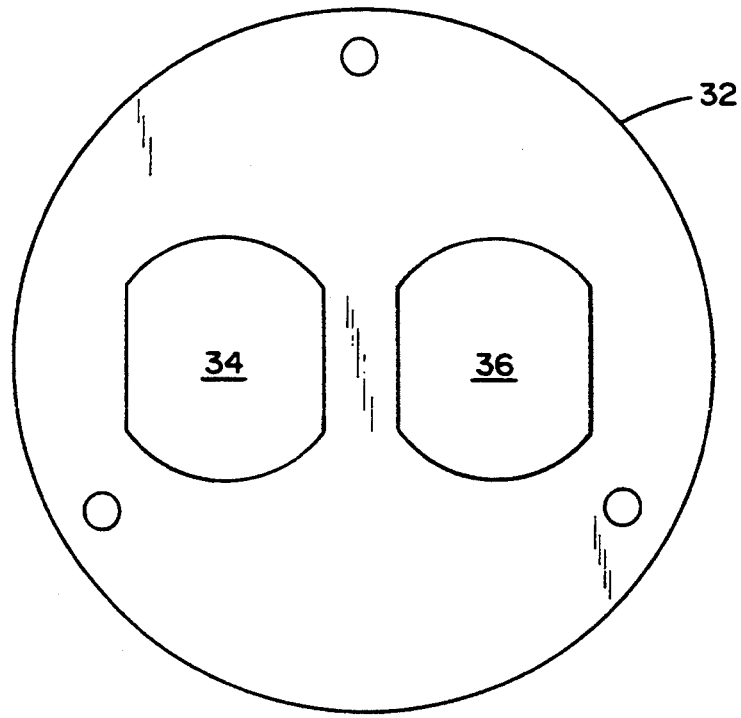
FIG. 3 illustrates a plan view of a gasket utilized in conjunction with the floor box wiring fitting of FIG. 1.

Reverting to the structure of the floor box wiring fitting 10, as shown in FIG. 1, the latter also incorporates a flanged ring 22 supported on an adjusting collar 24 having the junction box 14 suitably connected thereto. The adjusting collar is positioned within the aperture in the concrete floor, and may be encompassed by a suitable concrete sealant. Located on the adjusting collar is a metal plate 26 as also shown in FIG. 2 of the drawings which includes a pair of through openings 28 and 30 for forming a base under a gasket 32 so as to help the flat cover to seal. Moreover, the gasket 32 is positioned on the flanged ring below the carpet flange 20 as shown in FIG. 3, whereby the gasket may be a flat disc-shaped member constituted of neoprene or the like, and also having openings 34 and 36 provided therein adapted to be positioned in alignment with the openings 28 and 30 in the steel plate 26 for duplex receptacles which are adapted to be respectively engaged by plug connectors insertable through the carpet flange, as described further on hereinbelow.

Reference is now made to the detailed description of the inventive carpet flange 20, as shown in detail in FIGS. 4 through 10 of the drawings.

Figure 4:
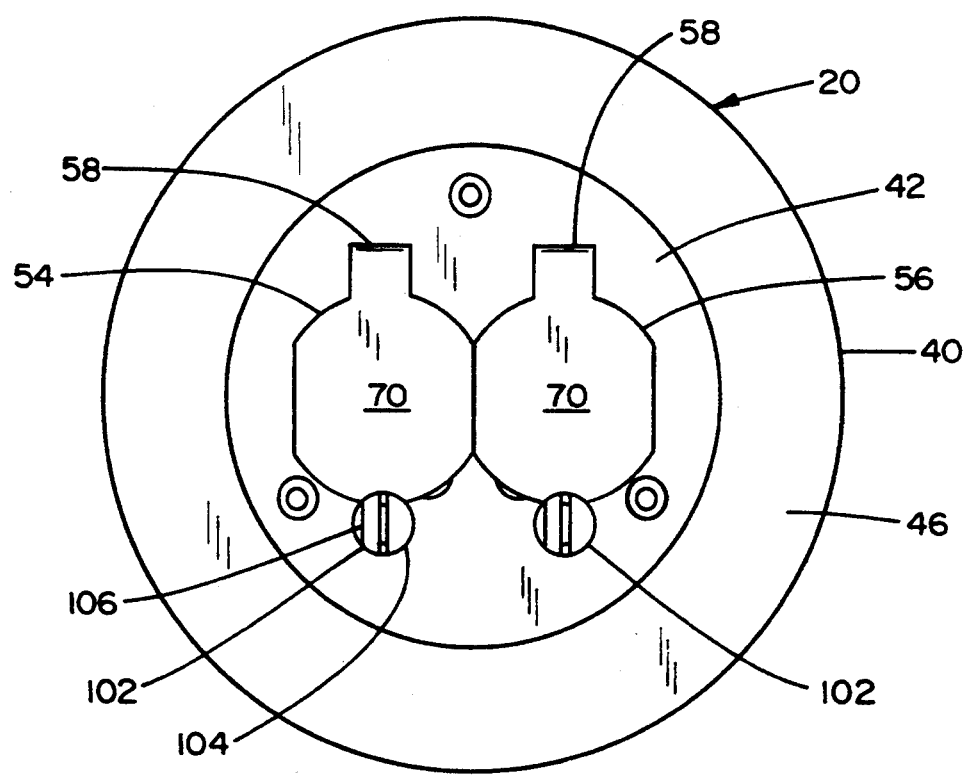
FIG. 4 illustrates a top plan view of the unitary or single-piece carpet flange incorporating the self-closing flap covers.
Figure 5:
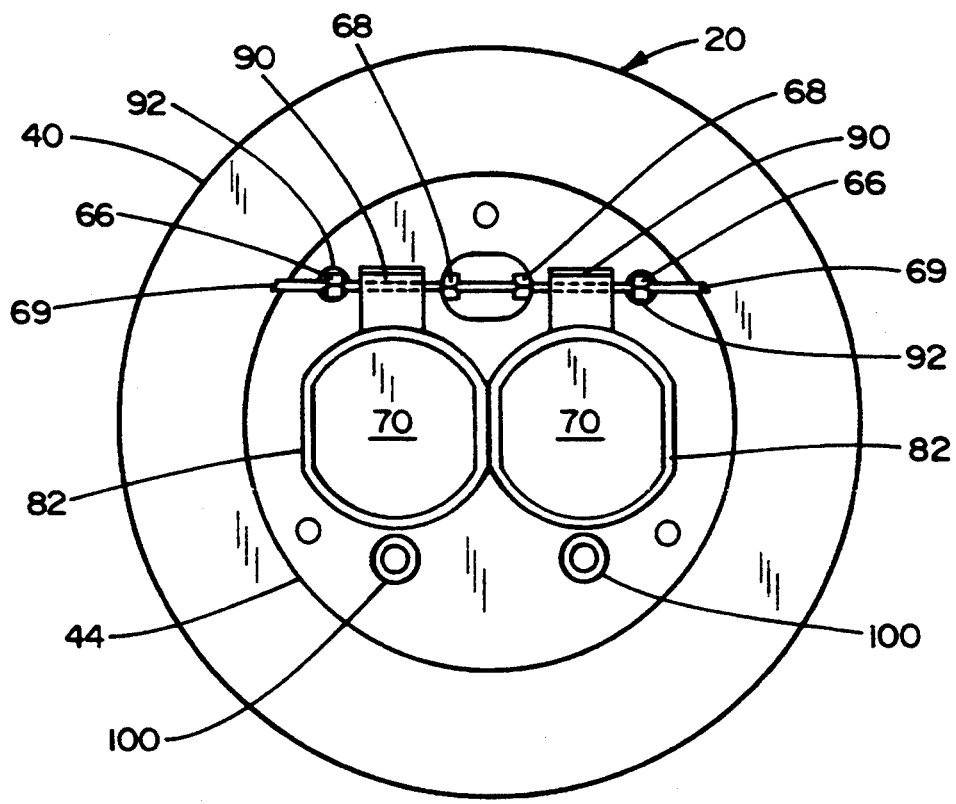
FIG. 5 illustrates a bottom view of the carpet flange of FIG. 2.
Figure 6:
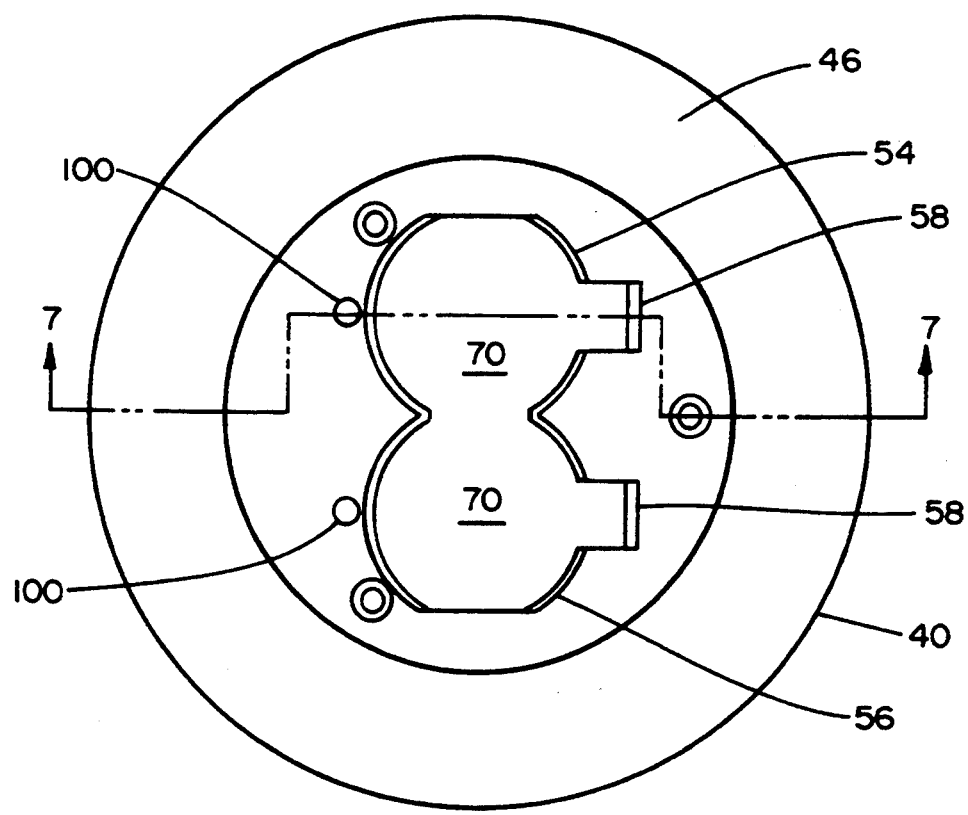
FIG. 6 illustrates a top plan view of the carpet flange plate structure shown with the flap covers having been removed therefrom.
Figure 7:
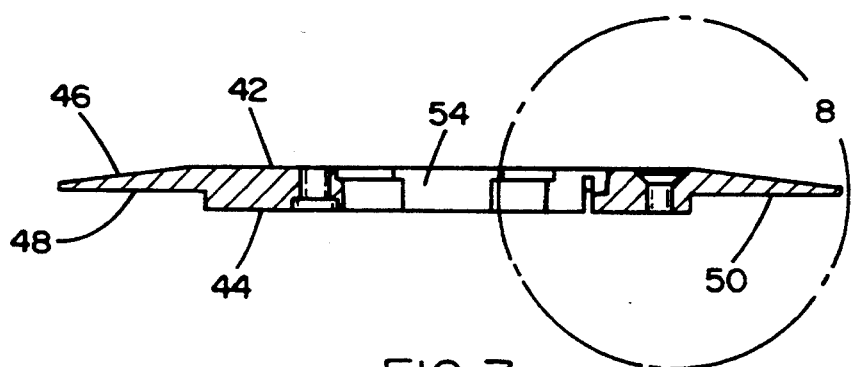
FIG. 7 illustrates a sectional view taken along line 7—7 in FIG. 6.
Figure 8:
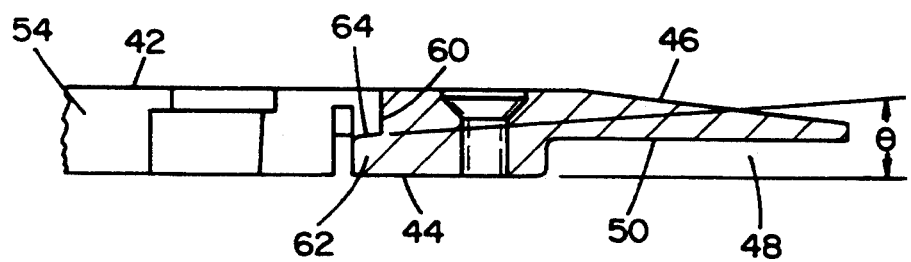
FIG. 8 illustrates a partial sectional view, shown on an enlarged scale, taken along arrow 8 in FIG. 7.

As shown by the top and bottom plan views of the carpet flange 20, referring to FIGS. 4 and 5, the latter includes a flap cover plate member 40 which is of essentially circular disc-shaped configuration having a flat horizontal upper center surface portion 42, and a flat lower surface portion 44 of annular disc-shaped configuration. Extending from the upper surface portion 42 is a peripheral flange portion 46 tapering radially outwardly and downwardly from the flat portion 42 and being upwardly recessed relative to the bottom surface portion 44 in order to provide a raised annulus 48 forming a raised surface 50 below which the carpeting may be clampingly engaged above the concrete floor surface.

The plate member 40 is provided with a pair of adjacently located openings 54 and 56 each adapted to be closed by a suitable openable flap cover, as described in further detail hereinbelow. The openings or cutouts 54 and 56 are each of a somewhat circular configuration each having an extended opening or cutout portion 58 which is adapted to receive a hinging portion of a cooperating flap cover 70. As shown in further detail, and specifically in the enlarged sectional view of FIG. 8, the end wall 60 of each of the opening portions 58 is somewhat tapered or angled relative to the vertical, and also provides for a raised step 62 having an upper surface 64 which is angled upwardly relative to the horizontal surfaces 42 and 44 at an angle $\Theta$ of approximately 5°.

As shown in the bottom view of the plate cover structure 40, which indicates flap covers located in the openings 54, 56; intermediate the hinging portions of the openings 54 and 56, in effect, in line extending across hinging opening portions 58, there are provided pockets 66 externally of each of the sides of the hinging opening portions 58 and a central pocket 68 including a further coaxial slotted groove portion 69 extending therethrough. These pockets 66 and 68 are adapted for staking the slotted groove portions 69 and closing thereof, as described hereinbelow. This slotted groove portion 69 is in alignment with holes adapted to receive the hinging portions of flap covers 70 which are insertable into the hinging openings 58 in the cover plate 40.

Figure 9:
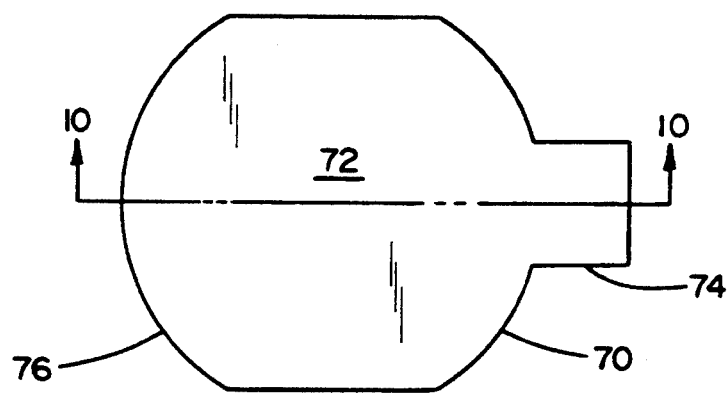
FIG. 9 illustrates a top plan view of the flap cover utilized in conjunction with the carpet flange as shown in FIG. 4.
Figure 10:
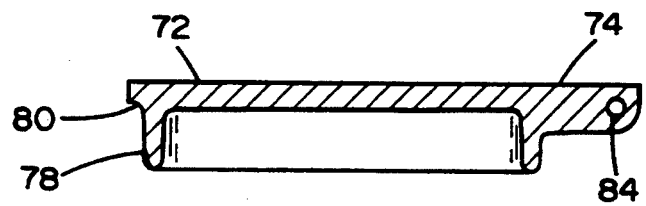
FIG. 10 illustrates a sectional view of the flap cover taken along line 10—10 in FIG. 9.

Reverting more specifically, to the constructions of the flap covers 70, as shown in FIGS. 9 and 10 of the drawings, these are essentially dimensioned in conformance with the openings 54, 56 and 58, having flat upper surfaces 72 with coplanar hinge portions 74 extending from the larger surface portions 76 thereof, which are adapted to be coplanar with surface 42 of the cover plate 40 in the closed positions of the flap covers 70. As shown particularly in FIG. 10, the flap covers 70 each include circumferentially extending, inwardly recessed depending flange portions 78 adapted to be received in smaller dimensioned openings of each of the cutouts 54 and 56 so as to have the edges 80 rest on shoulders 82 formed along the lower surfaces of these openings in the cover plate structure 40. A hinging aperture 84 is provided in each flap cover 70 such that, when each of the flap covers are positioned in closed alignment within the openings 54, 56 and 58, so as to be in axial alignment with the through openings in the flap cover plate 40 enabling hinge pins 90 to extend therethrough, extending coaxially within the slotted groove portions 69, as shown in FIG. 5. In lieu of separate hinge pins 90 being provided; i.e. one hinge pin for each of the flap covers, a single lengthier hinge pin 90 may extend within the slotted groove portions 69 substantially the entire length thereof so as to hingedly engage both flap covers 70. The pockets 66 and 68 which are present on opposite sides of each of the hinge portions are then staked onto the hinge pin or pins 90 so as to close the slotted groove portions 69 at those locations over the hinge pin or pins, and thereby latch each hinge pin or the single lengthier hinge pin 90 into locking engagement within the slotted groove portion 69 thereby preventing axial displacement thereof.

The positioning in the location of the hinge pin apertures 84 and insertion therethrough of the hinge pin or pins 90, upon pivottable opening of the flap covers 70 during use will enable the latter only to be swung upwardly approximately 85° relative to the horizontal surface 24 of the flap cover plate in view of the end surface 94 on each flap cover hinge portion being in surface contact with upwardly angled surface 64 in the respective opening 54 or 56 in the cover plate 40; in effect, limited to an acute angle such that, upon release of the opened flap cover 70 in the absence of any plug connector in the fitting, the flap cover 70 will close under the effect of gravity or its own weight into a closed position over the therewith associated opening 54 or 56 in the flap cover plate 40. This eliminates the need for any biasing member, such as springs or the like, which have heretofore been required to normally bias such flap covers into closed positions, thereby rendering the construction simpler and less expensive, while also reducing the possibility of such components being rendered inoperative due to the ingress of dirt.

Figure 12:
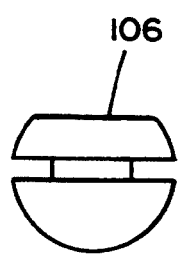
FIGS. 11 through 13 illustrate respectively side, top plan and bottom plan views of a latching member for releasably securing the flap covers in closed positions on the carpet flange cover plate structure.
Figure 11:
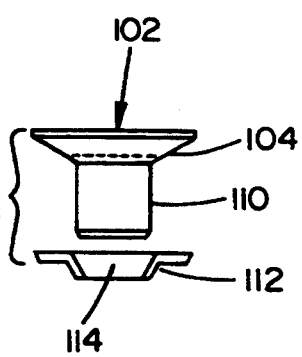
Figure 13:
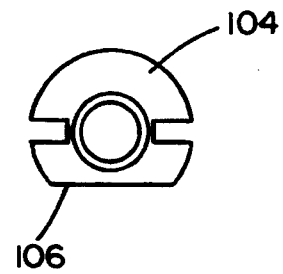

In order to maintain the flap covers 70 in a closed latched position when not in use, chamfered bores 100 may be provided in the upper surface 42 of the cover plate structure 40 adjacent the edge of each opening 54, 56, and with a suitable locking bolt 102 having a chamfered recessed head portion 104 having a flattened side edge 106, as shown in FIGS. 11 to 13, being insertable therein adapted in one rotational position thereof to lockingly overlap the edge of the closed flap cover 70 so as to maintain the latter in a latched position, while upon rotation of the bolt 102, the flattened edge 106 on the head of the latter will release the associated flap cover 70 and allow for the upward opening thereof to provide access into the fitting 10 through the openings 54 or 56.

In essence, the bolt, as shown in FIGS. 11 through 13, includes a tapered screwhead having one edge surface cut away so as to enable release of the flap covers, and with a smooth shaft or shank portion 110 of the bolt being insertable into an associated chamfered bore 100 formed in the upper surface 42 of the cover plate 40 which will inhibit axial removal thereof, while permitting rotational adjustment of the bolt. In order to prevent this axial removal of the bolt 102 while enabling rotation thereof, as illustrated in FIG. 11, a somewhat dish-shaped stainless steel one-way retainer 112 having a central hole 114 is pressed onto the shank portion 110 of the bolt to a position beneath the bolt head portion 104 so as to engage the wall of the therewith associated chamfered bore 100.

From the foregoing, it readily becomes apparent that the components of the novel carpet flange, all of which may be constituted of brass or suitable metallic materials, are inexpensive and simple to manufacture and to install, and provide a unique construction not at all contemplated in the art.

While there has been shown and described what is considered to be a preferred embodiment of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. In a floor box wiring fitting which is cast into the floor of a building structure, said fitting facilitating transmission of electrical power or telecommunication signals between a service head and a junction box located at opposite sides of the floor through insulated wires extending between said junction box and said service head; and said fitting including flap cover plate structure positionable proximate the upper face of said floor; the improvement comprising:

said flap cover plate structure including openings for electrical plugs extending therethrough; flap means being located in each of the openings of said flap cover plate structure; means for hingedly connecting said flap means to said flap cover plate structure for enabling pivotable opening and closing movement of said flap means relative to the opening respectively associated therewith; and cooperatively acting means on said flap means and on said flap cover plate structure to restrict the opening movement of each of said flap means to a predetermined acute angle relative to the closed positions thereof in said openings whereby each said flap means is inherently self-closing in the absence of an electrical plug element being mounted in the therewith associated opening in said flap cover plate structure.

2. A wiring fitting as claimed in claim 1, wherein said cooperatively acting means comprise mutually contactable surfaces on said flap means and on said flap cover plate structure to form limit stops restricting the opening movement of said flap means to said predetermined acute angle.

3. A wiring fitting as claimed in claim 1, wherein said acute angle in the opening movement of said flap means subtends a maximum angle of about 85° from a horizontal oriented upper surface of said flap cover plate structure.

4. A wiring fitting as claimed in claim 2, wherein said mutually contactable surfaces comprise curvilinear end surfaces on hinging extensions of said flap means and angled surfaces in portions of said openings for receiving said curvilinear end surfaces, said curvilinear end surfaces on the hinging extensions of said flap means and said angled surfaces in said opening portions in said flap cover plate structure being in surface contact to form said limit stops at the maximum opening movement of said flap means.

5. A wiring fitting as claimed in claim 4, wherein hinge pin means engage the hinging extensions and opening portions of the flap cover plate structure for respectively each said flap means so as to mount each said flap means for pivotable movement on said flap cover plate structure; and means for effectuating retention of each said hinge pin means in the interconnecting position between the therewith associated flap means and flap cover plate structure.

6. A wiring fitting as claimed in claim 5, wherein said hinge pin retention means comprises pockets formed in grooves receiving said hinge pin means, said pockets being staked over the hinge pin means so as to close said grooves at opposite sides of the hinging extension of each said flap means and to secure said hinge pin from axial displacement and disengagement with said flap means.

7. A wiring fitting as claimed in claim 6, wherein the lower surface of said flap cover plate structure includes said pockets for staking the hinge pin means upon assembly of said flap means with said flap cover plate structure.

8. A wiring fitting as claimed in claim 1, wherein said flap cover plate structure includes means for releasably latching said flap means in closed positions in the openings of said flap cover plate structure.

9. A wiring fitting as claimed in claim 8, wherein said latching means comprises recesses formed in the upper surface and overlapping the edge of each flap means distant from the hinged connection between said flap means and flap cover plate structure; and bolt means rotatably positionable in each said recess, each said bolt means having a head portion lockably engaging an associated flap means in one rotational orientation and enabling release of said flap means in another rotational orientation of said bolt means, and retainer means mounted on a shank of said bolt means for securing said bolt means against axial displacement in said recesses while facilitating rotational movement thereof.

10. A wiring fitting as claimed in claim 1, wherein said flap cover plate structure and flap means form a carpet flange.

11. A wiring fitting as claimed in claim 1, wherein said carpet flange is constituted from a metallic material.

12. A wiring fitting as claimed in claim 11, wherein said metallic material comprises brass.

* * * * *